US012026933B2

(12) United States Patent
Fan et al.

(10) Patent No.: US 12,026,933 B2
(45) Date of Patent: Jul. 2, 2024

(54) IMAGE RECOGNITION METHOD AND APPARATUS, AND DEVICE AND READABLE STORAGE MEDIUM

(71) Applicant: INSPUR SUZHOU INTELLIGENT TECHNOLOGY CO., LTD., Jiangsu (CN)

(72) Inventors: Baoyu Fan, Shandong (CN); Li Wang, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/032,794

(22) PCT Filed: Sep. 29, 2021

(86) PCT No.: PCT/CN2021/121897
§ 371 (c)(1),
(2) Date: Apr. 19, 2023

(87) PCT Pub. No.: WO2023/272993
PCT Pub. Date: Jan. 5, 2023

(65) Prior Publication Data
US 2023/0316722 A1    Oct. 5, 2023

(30) Foreign Application Priority Data
Jun. 29, 2021    (CN) .......................... 202110727794.1

(51) Int. Cl.
*G06V 10/77* (2022.01)
*G06V 10/75* (2022.01)
(Continued)

(52) U.S. Cl.
CPC ........ *G06V 10/7715* (2022.01); *G06V 10/751* (2022.01); *G06V 10/774* (2022.01);
(Continued)

(58) Field of Classification Search
CPC ............ G06V 10/7715; G06V 10/751; G06V 10/774; G06V 10/776; G06V 10/82; G06V 20/70; G06V 40/10
See application file for complete search history.

(56) References Cited

U.S. PATENT DOCUMENTS 11,830,275 B1 * 11/2023 Wang ..................... G06V 10/82
2020/0285896 A1 * 9/2020 Huang .............. G06F 18/21322
(Continued)

FOREIGN PATENT DOCUMENTS

| CN | 109711228 A | 5/2019 |
| CN | 109919073 A | 6/2019 |

(Continued)

OTHER PUBLICATIONS

Zhao, Cairong, et al. "Incremental generative occlusion adversarial suppression network for person reid." IEEE Transactions on Image Processing 30 (2021): 4212-4224.
(Continued)

*Primary Examiner* — Ming Y Hon
(74) *Attorney, Agent, or Firm* — IPro, PLLC (57) ABSTRACT

The present application discloses an image recognition method and apparatus, and a device and a readable storage medium. The method includes: obtaining a target image to be recognized; inputting the target image into a trained feature extraction model for feature extraction to obtain image features; and using the image features to recognize the target image to obtain a recognition result. In the present application, under the condition that the parameter quantity and the calculation amount of the feature extraction model do not need to be increased, the feature extraction model has relatively good feature extraction performance by means of isomorphic branch extraction and feature mutual mining, namely knowledge collaboration assistive training, and more accurate image recognition may be completed on the (Continued)

basis of the image features extracted by the feature extraction model.

20 Claims, 6 Drawing Sheets

(51) Int. Cl.
    *G06V 10/774*     (2022.01)
    *G06V 10/776*     (2022.01)
    *G06V 10/82*     (2022.01)
    *G06V 20/70*     (2022.01)
    *G06V 40/10*     (2022.01)

(52) U.S. Cl.
    CPC ............ *G06V 10/776* (2022.01); *G06V 10/82* (2022.01); *G06V 20/70* (2022.01); *G06V 40/10* (2022.01)

(56) References Cited

U.S. PATENT DOCUMENTS

| | | |
|---|---|---|
| 2020/0342271 A1 | 10/2020 | Wang et al. |
| 2020/0356802 A1 | 11/2020 | Zhao et al. |
| 2021/0019628 A1 | 1/2021 | Yao et al. |
| 2021/0056693 A1* | 2/2021 | Cheng ................. G06V 20/695 |
| 2021/0089752 A1 | 3/2021 | Wang et al. |
| 2022/0358791 A1* | 11/2022 | He ....................... G06N 3/0464 |
| 2022/0366236 A1* | 11/2022 | Mesmakhosroshahi ..................... G06N 3/08 |

FOREIGN PATENT DOCUMENTS

| | | |
|---|---|---|
| CN | 110163117 A | 8/2019 |
| CN | 110414432 A | 11/2019 |
| CN | 110414550 A | 11/2019 |
| CN | 110826484 A | 2/2020 |
| CN | 111128236 A | 5/2020 |
| CN | 111339931 A | 6/2020 |
| CN | 111488833 A | 8/2020 |
| CN | 111553428 A | 8/2020 |
| CN | 111639535 A | 9/2020 |
| CN | 112132832 A | 12/2020 |
| CN | 112232117 A | 1/2021 |
| CN | 112329619 A | 2/2021 |
| CN | 112668544 A | 4/2021 |
| CN | 112949590 A | 6/2021 |
| CN | 113033689 A | 6/2021 |
| CN | 113191461 A | 7/2021 |
| KR | 20200000824 A | 1/2020 |

OTHER PUBLICATIONS

Mostajabi, Mohammadreza, Michael Maire, and Gregory Shakhnarovich. "Regularizing deep networks by modeling and predicting label structure." Proceedings of the IEEE Conference on Computer Vision and Pattern Recognition. 2018.

Kaiguo Xia, Chang Tian. "Pedestrian re-recognition based on multi-auxiliary branch deep network." Communications Technology, 51.11 (2018): 2601-2605. Nov. 2018.

Sun, Dawei, et al. "Deeply-supervised knowledge synergy." Proceedings of the IEEE/CVF Conference on Computer Vision and Pattern Recognition. 2019.

Zhou, Yun, and Shurong Chen. "Behavior recognition method based on two-stream non-local residual network." Journal of Computer Applications 40.8 (2020): 2236.

PCT/CN2021/121897 international search report.

CN 202110727794.1 first office action and search report.

* cited by examiner

IMAGE RECOGNITION METHOD AND APPARATUS, AND DEVICE AND READABLE STORAGE MEDIUM

CROSS-REFERENCE TO RELATED APPLICATION

This application claims the priority of the Chinese Patent application filed on Jun. 29, 2021 before the China National Intellectual Property Administration with the application number of 202110727794.1, and the title of "IMAGE RECOGNITION METHOD AND APPARATUS, AND DEVICE AND READABLE STORAGE MEDIUM", which is incorporated herein in its entirety by reference.

FIELD

The present disclosure relates to the technical field of image processing and more particularly, to a method and an apparatus for picture identification, a device and a readable storage medium.

BACKGROUND

As is known, deep learning is adopted to solve problems in computer vision fields such as image classification, image segmentation and object detection, and has gained great success. In order to further improve network performance to improve picture identification performance, performance is generally further improved by constructing a more complex network structure, but improving performance by using this method has following disadvantages:

A deeper, wider or more complex network usually brings about surge in a number of parameters, which is not conducive to storage and deployment for portable devices. For example, in order to realize deployment of real-time pedestrian detection and identification program in a webcam, the network is required with a small amount of parameters (for ease of storing) and a high identification accuracy. In addition, the deeper, wider or more complex network usually brings about increase in computation amount, which is not conducive for application in scenarios with high real-time requirements. For example, a scenario of retrieval and tracking of criminal suspects. A large computation delay may cause a whole system to miss an optimal opportunity and to bring negative influence to system functions.

SUMMARY

An object of the present disclosure is to provide a method and an apparatus for picture identification, a device and a readable storage medium, which may improve picture identification performance without increasing an amount of parameters and computation amount.

In order to solve the technical problems stated above, the present disclosure provides the technical solution as follows:

A method for picture identification, including:
obtaining a target picture to be identified;
inputting the target picture into a trained feature extraction model for feature extraction to obtain an image feature; and
performing identification on the target picture by using the image feature to obtain an identification result;
wherein training the feature extraction model includes:
deriving homogeneous branches from a main network of a model to obtain homogeneous auxiliary training model;
inputting training samples to the homogeneous auxiliary training model in batches to obtain a sample image feature set corresponding to each of the homogeneous branches, training samples in each batch including a plurality of samples, which correspond to a plurality of classes;
calculating a maximum inter-class distance and a minimum inter-class distance respectively corresponding to each of sample image features between every two sample image feature sets;
calculating a knowledge synergy loss value by using the maximum inter-class distance and the minimum inter-class distance;
adjusting parameters of the homogeneous auxiliary training model by using the knowledge synergy loss value until the homogeneous auxiliary training model converges; and
removing the homogeneous branches in the converged homogeneous auxiliary training model to obtain the feature extraction model including only a main branch.

In some embodiments, deriving the homogeneous branches from the main network of the model to obtain the homogeneous auxiliary training model includes:
auxiliary derivating the homogeneous branches from the main network of the model; and/or
hierarchically derivating the homogeneous branches from the main network of the model.

In some embodiments, calculating the knowledge synergy loss value by using the maximum inter-class distance and the minimum inter-class distance includes:
calculating difference between a respective maximum inter-class distance and minimum inter-class distance, and accumulating the difference to obtain the knowledge synergy loss value.

In some embodiments, adjusting parameters of the homogeneous auxiliary training model by using the knowledge synergy loss value until the homogeneous auxiliary training model converges includes:
calculating a triplet loss value of the homogeneous auxiliary training model by using a triplet loss function;
determining a sum of the triple loss value and the knowledge synergy loss value as a total loss value of the homogeneous auxiliary training model; and
adjusting the parameters of the homogeneous auxiliary training model by using the total loss value until the homogeneous auxiliary training model converges.

In some embodiments, calculating the triplet loss value of the homogeneous auxiliary training model by using the triplet loss function includes:
traversing all training samples of each batch to calculate an absolute distance of intra-class difference of each sample in each batch; and
calculating the triplet loss value of the homogeneous auxiliary training model by using the absolute distance.

In some embodiments, performing identification on the target picture by using the image feature to obtain an identification result includes:
calculating vector distances between the image feature and labeled image features in a query data set;
comparing the vector distances to obtain a minimum vector distance; and
determining a label corresponding to the labeled image feature corresponding to the minimum vector distance as the identification result.

In some embodiments, obtaining the target picture to be identified includes:

obtaining a pedestrian picture to be identified, and determining the pedestrian picture as the target picture;

accordingly, the identification result corresponding to pedestrian identity information.

An apparatus for picture identification, including:

a picture acquisition module configured to obtain a target picture to be identified;

a feature extraction module configured to input the target picture to a trained feature extraction model for feature extraction to obtain an image feature;

an identification module configured to perform identification on the target picture by using the image feature to obtain an identification result; and a model training module configured to train the feature extraction model, the training process includes:

deriving the homogeneous branches from a main network of a model to obtain the homogeneous auxiliary training model;

inputting training samples to the homogeneous auxiliary training model in batches to obtain a sample image feature set corresponding to each of the homogeneous branches, training samples in each batch including a plurality of samples, which correspond to a plurality of classes;

calculating a maximum inter-class distance and a minimum inter-class distance respectively corresponding to each of sample image features between every two sample image feature sets;

calculating a knowledge synergy loss value by using the maximum inter-class distance and the minimum inter-class distance;

adjusting parameters of the homogeneous auxiliary training model by using the knowledge synergy loss value until the homogeneous auxiliary training model converges; and removing the homogeneous branches in the converged homogeneous auxiliary training model to obtain the feature extraction model including only a main branch.

An electronic device, including:

a memory for storing a computer program;

a processor for implementing steps of the method for picture identification stated above when the computer program is executed.

A readable storage medium, having a computer program stored thereon and the computer program, when executed by a processor, implementing steps of the method for picture identification stated above.

The method according to an embodiment of the present disclosure is applied to: obtain a target picture to be identified; input the target picture to a trained feature extraction model for feature extraction to obtain an image feature; and perform identification on the target picture by using the image feature to obtain an identification result. A process of training the feature extraction model includes: deriving homogeneous branches from a main network of a model to obtain a homogeneous auxiliary training model; inputting training samples to the homogeneous auxiliary training model in batches to obtain a sample image feature set corresponding to each of the homogeneous branches, training samples in each batch including a plurality of samples, which correspond to a plurality of classes; calculating a maximum inter-class distance and a minimum inter-class distance respectively corresponding to each of sample image features between every two sample image feature sets; calculating a knowledge synergy loss value by using the maximum inter-class distance and the minimum inter-class distance; adjusting parameters of the homogeneous auxiliary training model by using the knowledge synergy loss value until the homogeneous auxiliary training model converges; and removing the homogeneous branches in the converged homogeneous auxiliary training model to obtain the feature extraction model including only a main branch.

In the present embodiment, in training the feature extraction model, homogeneous branches are derived from the main network of the model, to obtain the homogeneous auxiliary training model. Then, after the training samples are input to the homogeneous auxiliary training model in batches, a sample image feature set output by each of the homogeneous branches may be obtained. Then, between every two sample image feature sets, the maximum and minimum inter-class distances corresponding to each of the sample image features are mutually calculated, and the knowledge synergy loss value is calculated; the parameters of the homogeneous auxiliary training model are adjusted based on the knowledge synergy loss value until the homogeneous auxiliary training model converges. That is to say, in training the model, the samples output from the homogeneous branches may be mutually referred to and mined. Finally, after the homogeneous auxiliary training model converges, homogeneous branches derived for auxiliary training are removed, to obtain the feature extraction model with only the main branch. In this way, by deriving the homogeneous branches and performing mutual feature mining, that is, knowledge collaborative auxiliary training, without increasing an amount of parameters and computation amount of the feature extraction model, the feature extraction model has better feature extraction performance and may complete more accurate picture identification based on the image features extracted by the feature extraction model.

Correspondingly, an apparatus for picture identification, a device and a readable storage medium corresponding to the method for picture identification described above are further provided in the embodiments of the present disclosure, which have technical effects described above and are not described repeatedly here again.

BRIEF DESCRIPTION OF THE DRAWINGS

In order to explain the embodiments of the present application or the technical solutions in the prior art more clearly, a brief description will be given below with reference to the accompanying drawings which are used in the description of the embodiments or the prior art, and it is obvious that the drawings in the description below are merely some embodiments of the present application, and a person skilled in the art may obtain other embodiments according to these drawings without involving any inventive effort.

DETAILED DESCRIPTION

In order to make a person skilled in the art better understand the solution of the present application, the following is a further detailed description of the present application in combination with the drawing and the embodiments. Obviously, the described embodiments are only a part of the embodiments of the present application, not all of the embodiments. Based on the embodiments of the present application, all other embodiments obtained by a person skilled in the art without making creative labor belong to the scope of protection in the present application.

Figure 1:
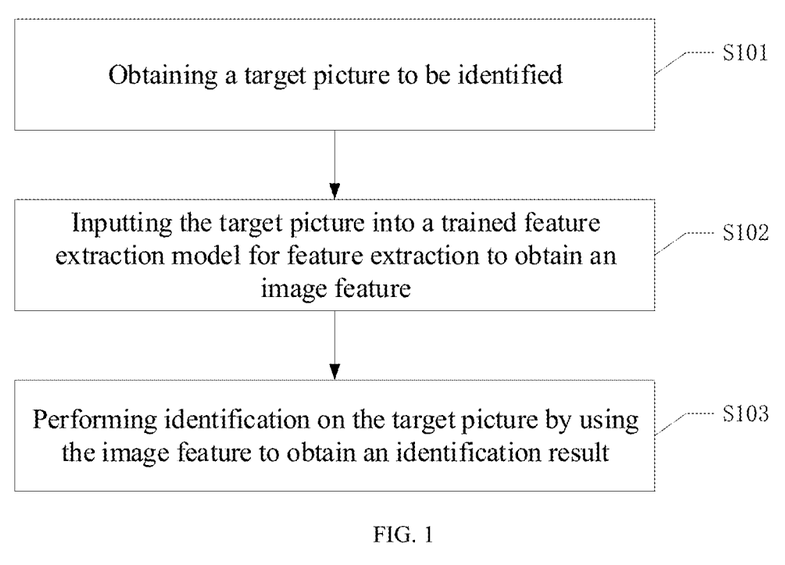
FIG. 1 is an implementation flow chart of a method for picture identification according to an embodiment of the present disclosure.

Referring to FIG. 1, which is a flowchart of a method for picture identification according to an embodiment of the present disclosure, the method includes following steps S101 to S103.

In step S101, a target picture to be identified is obtained.

The target picture may be any picture that needs to be identified, such as a human image, an image of an object, or an image of a monitored scenario, etc.

The target picture to be identified may be obtained by real-time acquisition, or by receiving pictures sent by other devices or applications, or by reading directly from storage media.

In an implementation of the present disclosure, the step S101 in which the target picture to be identified is obtained includes: obtaining a pedestrian picture to be identified, and determining the pedestrian picture as the target picture; accordingly an identification result finally obtained corresponding to pedestrian identity information. That is, pedestrian identification may be achieved effectively.

In step S102, the target picture is input to a trained feature extraction model for feature extraction to obtain an image feature.

After the target picture is obtained, the trained feature extraction model may be adopted to extract a feature of the target picture, to obtain the image feature of the target picture.

That is, before the target picture is identified, a feature extraction model needs to be trained in advance in order to extract the image feature of the target picture.

Figure 2:
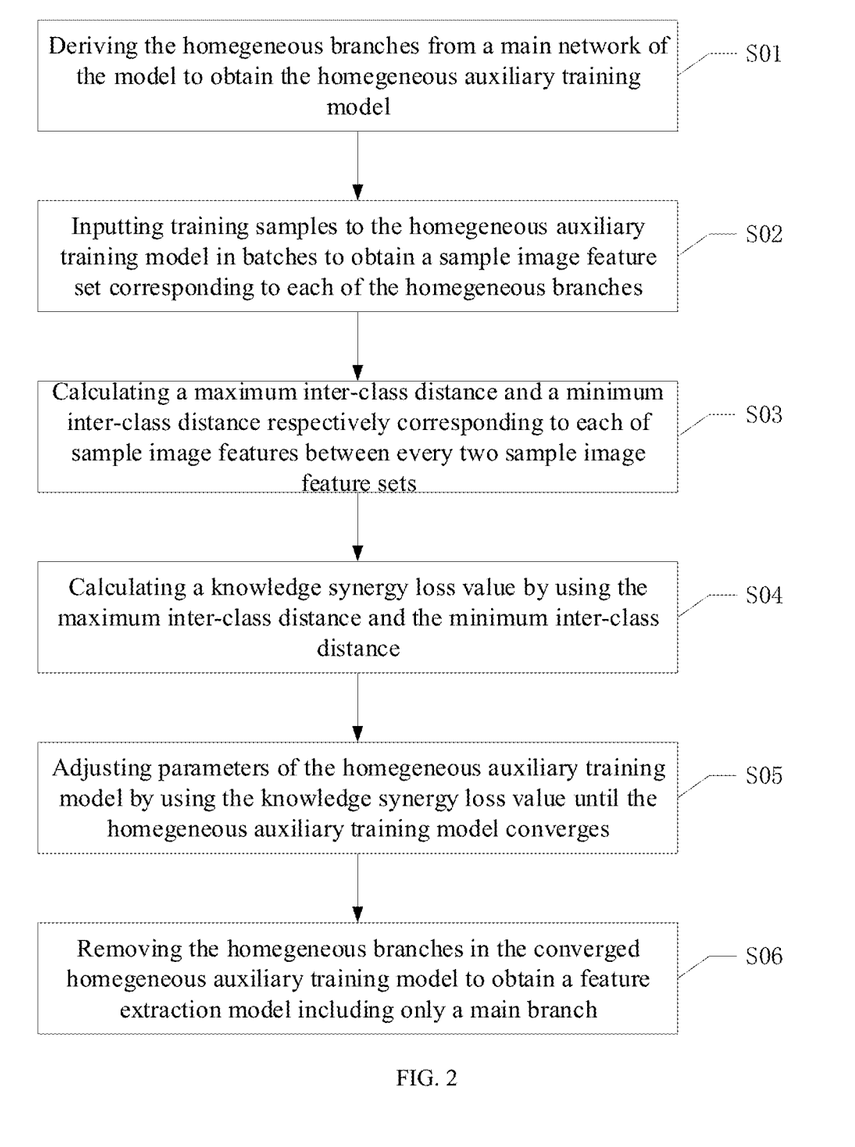
FIG. 2 is a schematic diagram of training of a feature extraction model according to an embodiment.

Referring to FIG. 2, which is a schematic diagram of training of a feature extraction model in the present embodiment. A process of training the feature extraction model includes following step S01 to S06.

In step S01, homogeneous branches are derived from a main network of the model to obtain a homogeneous auxiliary training model.

In the present disclosure, a convolutional neural network may be trained to obtain the feature extraction model. The convolutional neural network is usually a deep structure formed by stacking multiple layers of networks. Generally, several layers of ResNet network (a residual network) including Shortcut Connections, several layers of Plain networks and several layers of VGG networks are included in the convolutional neural network, all of which are of a multilayer stacked structure, and each single-branch network is called a main network herein.

After the homogeneous branches are derived from the main network of the model, the homogeneous auxiliary training model may be obtained. This type of homogeneous branch may also be regarded as an auxiliary training branch or an auxiliary branch for short. An expression "homogeneous" means that a network structure of the auxiliary branch is the same as that of the main network. The auxiliary training branch based on a homogeneous network has following characteristics.

1. A network structure of the homogeneous auxiliary training branch is similar to that of the main network, so it is not necessary to design their network structures separately, thus with relatively simple network design.

2. The homogeneous auxiliary training branch has natural branch similarity, that is, respective auxiliary training branches have a same structure and a same input, but have different initial weight values. Each of the branches provides a respective view on input data.

3. By mining feature information between auxiliary branches, the branches may be regularized with each other, thus promoting respective branches to move toward higher accuracy.

In the present embodiment, following two different homogeneous branch derivation manners may be adopted to derive the homogeneous branch.

Figure 3:
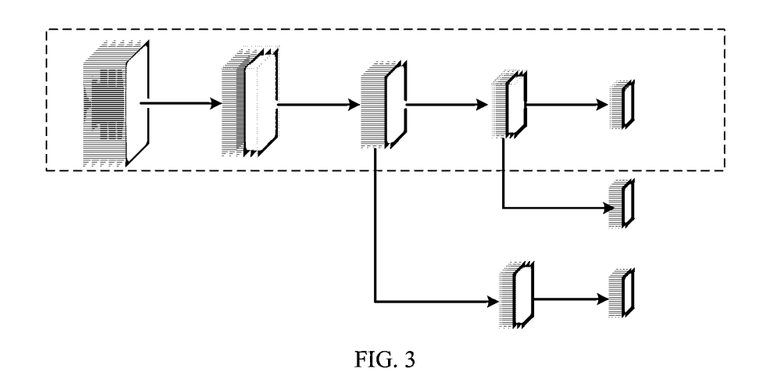
FIG. 3 is a schematic diagram of an auxiliary derivated homogeneous branch according to an embodiment of the present disclosure.

In a first manner, the homogeneous branches are auxiliary derivated from the main network of the model.

Reference is made to FIG. 3, which is a schematic diagram of an auxiliary derived homogeneous branch according to an embodiment of the present disclosure. A network structure in the dotted box is the main network of the model, and a structure outside the dotted box is the auxiliary derived homogeneous branch.

Figure 4:
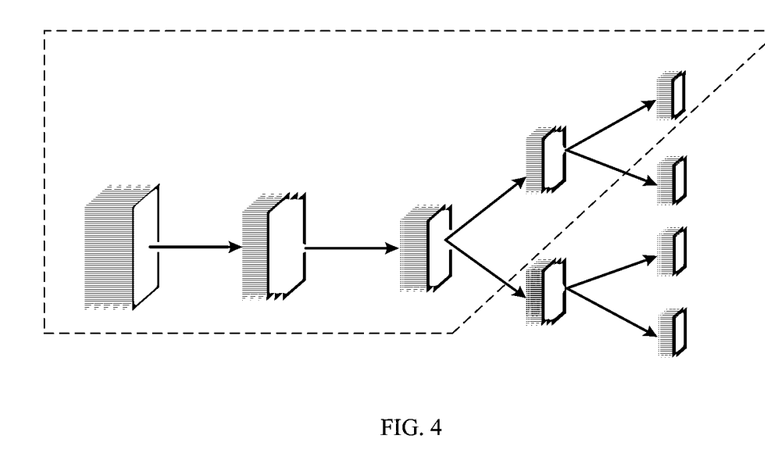
FIG. 4 is a schematic diagram of a hierarchically derivated homogeneous branch according to an embodiment of the present disclosure.

In a second manner, the homogeneous branches are hierarchically derived from the main network of the model.

Reference is made to FIG. 4, which is a schematic diagram of a hierarchically derivated homogeneous branch according to an embodiment of the present disclosure. A network structure in the dotted box is the main network of the model, and a structure outside the dotted box is the auxiliary derived homogeneous branch.

The auxiliary derived homogeneous network is asymmetric, and the hierarchically derived homogeneous network has a symmetrical structure.

In practical applications, the homogeneous branches may be derived in the first manner alone, in the second manner alone, or partially in the first manner and partially in the second manner.

In step S02, training samples are input to the homogeneous auxiliary training model in batches to obtain a sample image feature set corresponding to each of the homogeneous branches.

Training samples in each batch includes a plurality of samples, which correspond to a plurality of classes.

In the present embodiment, training samples corresponding to various classes may be prepared in advance. After the homogeneous auxiliary training model is obtained, the training samples may be input to the homogeneous auxiliary training model in batches to extract image features of the samples. Because the homogeneous auxiliary training model has homogeneous auxiliary training branches, the sample image feature set corresponding to each of the homogeneous branches may be obtained.

In step S03, a maximum inter-class distance and a minimum inter-class distance respectively corresponding to each of sample image features may be calculated between every two sample image feature sets.

Assuming that there are sample image feature sets A={a1, a2, a3, . . . ai}, B={b1, b2, b3, . . . bi} and C={c1, c2, c3, . . . , ci}, maximum inter-class distances and minimum inter-class distances respectively corresponding to each sample image feature in set A and set B, in set B and set C, and in set A and set C may be calculated.

In step S04, a knowledge synergy loss value is calculated by using the maximum inter-class distance and the minimum inter-class distance.

That is, the knowledge synergy loss value is calculated based on the maximum inter-class distance and the minimum inter-class distance calculated in step S03.

Difference between a respective maximum inter-class distance and minimum inter-class distance may be calculated, and the difference may be accumulated to obtain the knowledge synergy loss value. Of course, in other embodiments in the present disclosure, the knowledge synergy loss value may also be obtained by accumulating a ratio of a respective maximum inter-class distance and minimum inter-class distance after the ratio of a respective maximum inter-class distance and minimum inter-class distance is calculated.

In step S05, parameters of the homogeneous auxiliary training model are adjusted by using the knowledge synergy loss value until the homogeneous auxiliary training model converges.

After the knowledge synergy loss value is obtained, the parameters of the homogeneous auxiliary training model may be adjusted by using the knowledge synergy loss value until the homogeneous auxiliary training model converges. Convergence of the homogeneous auxiliary training model may correspond to a case where a loss value of the model tends to be stable and no longer changes, or where the loss value is less than a preset threshold.

In an implementation of the present disclosure, in order to improve training performance, the parameters of the homogeneous auxiliary training model may also be adjusted based on a triplet loss value and the knowledge synergy loss value. The step S05 in which the parameters of the homogeneous auxiliary training model are adjusted by using the knowledge synergy loss value until the homogeneous auxiliary training model converges includes following steps I to III.

In step I, the triplet loss value of the homogeneous auxiliary training model is calculated by using a triplet loss function.

A calculation process of the triple loss value includes following steps 1 and 2.

In step 1, all training samples of each batch are traversed to calculate an absolute distance of intra-class difference of each sample in each batch.

In step 2, the triplet loss value of the homogeneous auxiliary training model is calculated by using the absolute distance.

In step II, a sum of the triple loss value and the knowledge synergy loss value is determined as a total loss value of the homogeneous auxiliary training model.

In step III, the parameters of the homogeneous auxiliary training model are adjusted by using the total loss value until the homogeneous auxiliary training model converges.

In step S06, the homogeneous branches in the converged homogeneous auxiliary training model are removed to obtain a feature extraction model including only a main branch.

After the homogeneous auxiliary training model converges, the homogeneous branches for auxiliary training are removed, to obtain the feature extraction model only including the main branch. In other words, a structure of the feature extraction model is the same as that with no homogeneous branches derived.

For ease of facilitate understanding a training process of the feature extraction model, above steps S01 to S06 will be described in detail below.

Firstly, the homogeneous branches are derived from a main network of the model to obtain the homogeneous auxiliary training model. Then, the training samples are input to the homogeneous auxiliary training model in batches to obtain the sample image feature set.

For ease of understanding, calculation methods in two loss functions for Triplet Loss and cross-entropy are described in detail below.

Figure 5:
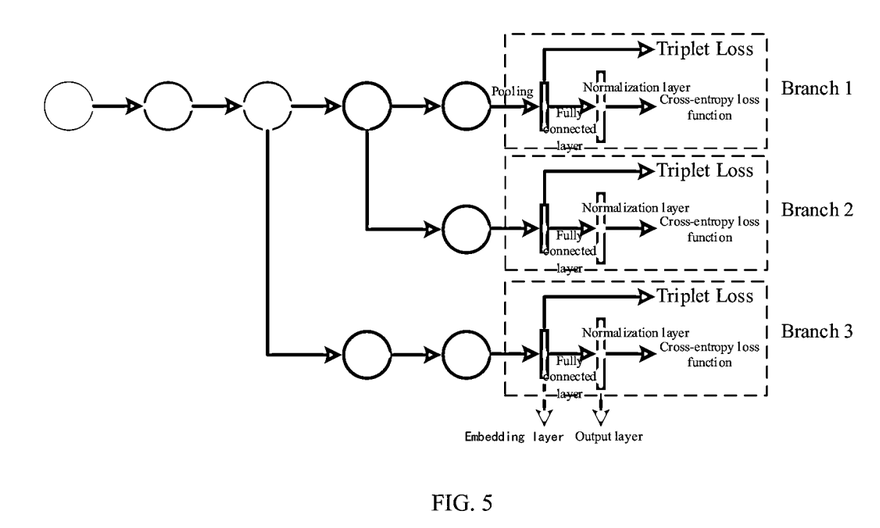
FIG. 5 is a schematic diagram of loss calculation according to an embodiment of the present disclosure.

Reference is made to FIG. 5, which is a schematic diagram of loss calculation according to an embodiment of the present disclosure. A network architecture shown in FIG. 5 is a homogeneous auxiliary training model with homogeneous branches added to a main network shown in FIG. 6.

Firstly, a cross-entropy loss function of each of the branches is obtained, with a formula as follows:

$$\min_{\theta} \sum_{b=1}^{B} \alpha^b L_c^b(x, y, \theta^b);$$

$$L_c^b(x, y, \theta^b) = -\frac{1}{N} \sum_{n=1}^{N} \sum_{k=1}^{K} y_n^k \log(f_c^k(x_n, \theta^b));$$

wherein a network input is expressed as: $D_t = \{(x_n, y_n) | n \in [1,N]\}$, $x_n$ represents an n-th image (namely, sample), $y_n$ represents a classification label corresponding to the image. $f_c(x_n, \theta^b)$ represents an output feature of the network model, and a subscript c represents obtaining a classification-layer feature of the network after passing through a softmax layer (a normalization layer). As shown in FIG. 5, the cross entropy loss function is calculated to obtain an output feature $f_c(\cdot)$ of the classification layer of the network, and K represents a dimension of a feature vector of the classification layer output by the network. B represents a number of branches, $\alpha^b \in (0,1]$ is a superparameter and represents a weight of cross entropy loss of a respective branch.

The above formula is to calculate and perform weighted summation on cross entropy losses of respective homogeneous branches of an input image.

In the present embodiment, the triplet loss function is configured to calculate a maximum intra-class distance and a minimum intra-class distance in the triplet data by mining hard samples in the input data, and the distances described above are constrained in the loss function to make the maximum intra-class distance as small as possible and the minimum intra-class distance as large as possible, thus increasing a distance between different types of samples in a feature space after the samples are mapped (features are obtained after calculation by a deep learning network), and gathering samples of a same class as much as possible, thus improving identification accuracy. The triplet loss function of the present disclosure may be expressed by a following formula:

$$L_{TriHard}^b = -\frac{1}{N}\sum_{a=1}^{N}\left[\max_{y_p=y_a} d(f_e^a, f_e^p) - \min_{y_n \neq y_a} d(f_e^a, f_e^n) + m\right]_+$$

wherein $[\bullet]_+$ represents max $d(\bullet,0)$, $d(\bullet,\bullet)$ represents calculating a distance between vectors, which may be an Euclidean distance, a cosine distance, etc. $f_e^a = f(x_a, \theta^b)$, a represents an anchor, that is, an anchor sample. $f_e(\bullet)$ represents obtaining a feature of an image in an Embedding layer of the network. In the present disclosure, all samples in each batch are traversed, and the traversed samples are called anchor samples, and a maximum intra-class distance and minimum inter-class distance of anchor sample features are calculated and brought into the above formula. $f^p$ represents an image feature of a same class as the anchor sample. $f^n$ represents an image feature of a different class from the anchor sample. It should be noted here that, and in the present disclosure, $f^a$, $f^p$, $f^n$ all are features extracted from the Embedding layer in the network, as shown in FIG. 5.

Furthermore, an enhanced triple loss function provided by the present disclosure may be adopted, with a formula as follows:

$$L_{E\_TriHard}^b = L_{TriHard}^b + \beta \frac{1}{N} \sum_{a=1}^{N} \left(\frac{d(f_e^a, f_e^p)}{d(f_e^a, f_e^n)}\right)$$

A traditional triple loss function only considers a difference between an intra-class difference and an inter-class difference of samples, but ignores an absolute distance (that is, an absolute value) of the intra-class difference.

With constraints described above in the present disclosure, $d(f_e^a, f_e^p)$ may develop to be smaller and $d(f_e^a, f_e^n)$ may develop to be larger, that is, the absolute distance of the intra-class difference is limited.

Therefore, in a case of homogeneous auxiliary branches in the present disclosure, a following loss functions may be adopted:

$$L = \min_{\theta} \sum_{b=1}^{B} \left(\alpha^b L_c^b(x, y, \theta^b) + \gamma^b L_{E\_TriHard}^b\right)$$

wherein $\gamma$ is a hyperparameter, and may be trained or preset.

That is, the triplet loss function is implemented as follows.

1) All samples of each batch are traversed, as described above, and if each batch contains N samples, traversing is made n times.

2) The minimum intra-class distance and maximum inter-class distance of each sample in each batch are calculated. (There is one minimum intra-class distance and maximum inter-class distance for each sample in one batch).

3) $L_{E\_TriHard}^b$ is calculated with a formula (4).
4) $L_c^b(x, y, \theta^b)$ is calculated with a formula (2).
5) Each of the homogeneous branches is traversed and $L_c^b(x, y, \theta^b)$ and $L_{E\_TriHard}^b$ of each branch are calculated according to above steps.
6) The total loss $$L = \min_{\theta} \sum_{b=1}^{B} \left(\alpha^b L_c^b(x, y, \theta^b) + \gamma^b L_{E\_TriHard}^b\right)$$

is calculated.

In addition, due to natural similarity of the homogeneous branches, embedding-layer features of different branches may be learnt from each other. Hard samples may be mutually mined between branches, to obtain an inter-branch triple loss. With above ideas, the present disclosure further proposes the knowledge synergy for hard sample mutual mining (KSH), that is, a KSH loss function which is a loss function used to calculate the knowledge synergy loss value. Through KSH, knowledge synergy may be established between each two branches, which increases information exchange between branches and improves classification accuracy. The KSH loss function may be expressed as:

$$L_{ksh} = \frac{1}{N} \sum_{\substack{(m,n)\in N \\ m \neq n}}^{N} \sum_{\substack{(u,v)\in B \\ u \neq v}}^{B-1} [\max(d_{pos}(f_{em}^u, f_{en}^v)) - \min(d_{neg}(f_{em}^u, f_{en}^v)) + \alpha]_+$$

wherein $f_{em}^u$ represents an embedding-layer feature ( ) of an m-th sample in a u-th branch, $f_{en}^v$ represents an embedding-layer feature of an n-th sample in a v-th branch. $d_{pos}(\bullet,\bullet)$ represents calculating a distance between samples of a same class, and $d_{neg}(\bullet,\bullet)$ represents calculating a distance between samples of different classes. a is a hyperparameter and is a constant. $[\bullet]_+$ represents max$(\bullet,0)$.

A calculation method of the KSH loss function is concisely expressed by above formula, and a calculation process of the KSH loss function will be summarized with the following text.

Execution steps of the knowledge collaborative loss function may be summarized as follows.

1) As above, it is assumed that each batch sample contains N samples and multiple classes.

2) Data of each batch is input to the network to obtain output results of samples in embedding layers of respective homogeneous branches of the network. For example, assuming that the network contains three homogeneous branches, there are three output results of embedding layers of the homogeneous branches, and $f_e(x, \theta^1)$, $f_e(x, \theta^2)$, $f_e(x, \theta^3) \in \mathbb{R}^{H \times N}$ and x represents a set of all input samples of each batch.

3) Output results of all branches are traversed successively. A traversal method is as follows.

4) it is assumed that there are three branches: branch 1, branch 2 and branch 3 and there are six forms of mutual mining for hard samples between branches: mutual mining for hard samples between branches (1, 2), mutual mining for hard samples between branches (1, 3), mutual mining for hard samples between branches (2, 1), mutual mining for hard samples between branches (2, 3), mutual mining for hard samples between branches (3, 1), and mutual mining for hard samples between branches (3, 2). Mutual mining for hard samples between the branches (1, 2) is explained below.

5) Firstly, embedding-layer features $f_e(x, \theta^1) \in \mathbb{R}^{H \times N}$ of a first branch are traversed. There are N samples in total and H dimensions. Therefore, the branch is traversed N times. Assuming that a first sample is taken, it is expressed as $f_{e1}^1 \in \mathbb{R}^{H \times 1}$, wherein a superscript 1 represents the first branch and a subscript e1 represents a feature of the first sample of the embedding layer of the first branch.

Then, an embedding-layer feature $f_e(x, \theta^2) \in \mathbb{R}^{H \times N}$ of a second branch is taken. Maximum intra-class distances and minimum inter-class distances for all samples (with no same ID) in $f_{e1}^1$ and $f_e(x, \theta^2)$ except themselves are calculated. Then, a following formula is used to calculate the knowledge collaborative loss:

$$loss = [\max(d_{pos}(f_{em}^u, f_{en}^v)) - \min(d_{neg}(f_{em}^u, f_{en}^v)) + \alpha]_+$$

Then, a method for traversing the second sample $f_{e2}^1$ to calculate the loss is the same as described above. Traversing is made successively until an N-th sample $f_{eN}^1$ of the first branch. A hard sample mining process for the branches (1, 2) is completed by transversing as described above.

6) Similarly, a hard sample mining process between the other branches: (1,3), (2,1), (2,3), (3,1), (3,2) may be made by transversing.

7) Knowledge collaborative losses of all combinations of all the above samples are summed and averaged to get a final knowledge collaborative loss $L_{ksh}$.

A total loss function of the knowledge collaborative network based on homogeneous branches is:

$$L_{sum} = L + L_{ksh}.$$

In the above, a whole training method of the knowledge collaborative network based on the homogeneous branches is described, which involves how to establish a homogeneous network and how to get a Loss function.

In the following, training and inferring of the network will be briefly described.

As known, a convolutional neural network needs training to converge after it is established. After convergence, trained network weights may be obtained. In a process of inferring, a weight coefficient trained by the network is preloaded to classify input data finally.

A training process includes following steps 1) to 5).

In step 1), appropriate deriving locations are selected according to different network structures and an auxiliary training branch based on the homogeneous network is constructed.

In step 2), a cross entropy loss, a triple loss and a knowledge collaborative loss are calculated for all auxiliary training branches.

In step 3), the network is trained according to above loss function to cause it to converge.

In step 4), trained weights are stored.

In step 5), all auxiliary training branches are removed and only the main network is kept.

Figure 6:
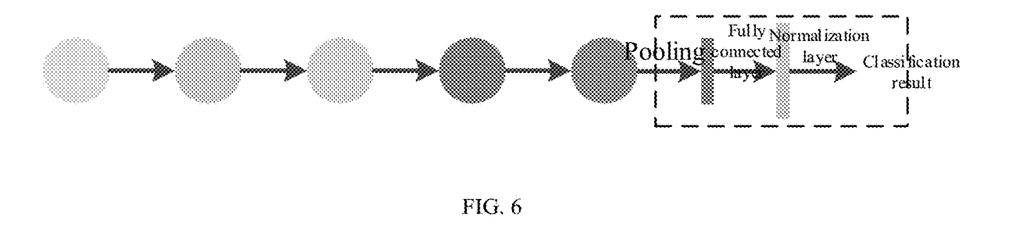
FIG. 6 is a schematic diagram of a main network in a feature extraction model according to an embodiment of the present disclosure.

Step 5) may be referred to FIG. 6. A network architecture shown in FIG. 6 is a structure of a main branch of the homogeneous auxiliary training model shown in FIG. 5 before adding homogeneous branches and after removing homogeneous branches.

A training process of the convolutional neural network is as follows. The training process of the convolutional neural network includes two stages. A first stage is a stage of data transmission from a low level to a high level, that is, a forward propagation stage. The other stage is a stage where an error is propagated from a high level to a low level for training when a result of forward propagation is not consistent with what is expected, that is, a back propagation stage. A corresponding training and convergence process in step 3) includes following content.

1. Weights of a network layer are initialized, generally are randomly initialized.

2. Input image data is propagated forward through a convolution layer, a down-sampling layer, a fully connected layer and other layers to obtain an output value.

3. Error between the output value of the network and a target value (label) is calculated.

4. The error is propagated back to the network, and back propagation errors of respective layers of the network: the fully connected layer, the convolution layer and other layers, are obtained successively.

5. All of weight coefficients in the network are adjusted by respective layers of the network according to the back propagation errors of respective layers, that is, the weights are updated.

6. A new image data is randomly reselected, and then the second step is performed and forward propagation of the network may be carried out to get the output value.

7. Iteration is performed infinitely, when the error between the output value of the network and the target value (label) is less than a certain threshold, or a number of iterations exceeds a certain threshold, the training is ended.

8. Network parameters of all trained layers are stored.

In step S103, identification is performed on the target picture by using the image feature to obtain an identification result.

After obtaining the image feature, the image feature may be used to identify the target picture to get the identification result.

In an implementation of the present disclosure, the step S103 in which the identification is performed on the target picture by using the image feature to obtain the identification result includes following steps 1 to 3.

In step 1, vector distances between the image feature and labeled image features in a query data set are calculated.

In step 2, vector distances are compared to obtain a minimum vector distance.

In step 3, a label corresponding to the labeled image feature corresponding to the minimum vector distance is determined as the identification result.

For ease of description, following three steps are combined to explain.

That is, in the present embodiment, the labeled image features may be stored in the query data set in advance. Then, after extracting the image feature of the target picture, the minimum vector distance may be obtained by calculating the vector distances between the image feature and labeled image features in a query data set, and finally the label corresponding to the labeled image feature corresponding to the minimum vector distance is determined as the identification result. That is to say, content marked by the label is exactly content of the identification result. In the present embodiment, the content of the label is not limited.

Of course, in other implementations of the present disclosure, it is also possible to input a query image and the image to be identified into the feature extraction model, and the feature extraction model extracts image features of the query image and the image to be identified respectively, and then determines an image from the query image corresponding to a same object (such as a pedestrian) as the image to be identified based on similarity of the image features, to realize a purpose of pedestrian re-identification.

The method according to an embodiment of the present disclosure is applied to: obtain a target picture to be identified; input the target picture to a trained feature extraction model for feature extraction to obtain an image feature; and perform identification on the target picture by using the image feature to obtain an identification result. A process of training the feature extraction model includes: deriving homogeneous branches from a main network of a model to obtain a homogeneous auxiliary training model; inputting training samples to the homogeneous auxiliary training model in batches to obtain a sample image feature set corresponding to each of the homogeneous branches, training samples in each batch including a plurality of samples, which correspond to a plurality of classes; calculating a maximum inter-class distance and a minimum inter-class distance respectively corresponding to each of sample image features between every two sample image feature sets; calculating a knowledge synergy loss value by using the maximum inter-class distance and the minimum inter-class distance; adjusting parameters of the homogeneous auxiliary training model by using the knowledge synergy loss value until the homogeneous auxiliary training model converges; and removing the homogeneous branches in the converged homogeneous auxiliary training model to obtain the feature extraction model including only a main branch.

In the present embodiment, in training the feature extraction model, homogeneous branches are derived from the main network of the model, to obtain the homogeneous auxiliary training model. Then, after the training samples are input to the homogeneous auxiliary training model in batches, a sample image feature set output by each of the homogeneous branches may be obtained. Then, between every two sample image feature sets, the maximum and minimum inter-class distances corresponding to each of the sample image features are mutually calculated, and the knowledge synergy loss value is calculated; the parameters of the homogeneous auxiliary training model are adjusted based on the knowledge synergy loss value until the homogeneous auxiliary training model converges. That is to say, in training the model, samples output from the homogeneous branches may be mutually referred to and mined. Finally, after the homogeneous auxiliary training model converges, homogeneous branches derived for auxiliary training are removed, to obtain the feature extraction model with only the main branch. In this way, by deriving the homogeneous branches and performing mutual feature mining, that is, knowledge collaborative auxiliary training, without increasing an amount of parameters and computation amount of the feature extraction model, the feature extraction model has better feature extraction performance and may complete more accurate picture identification based on the image features extracted by the feature extraction model.

In order to facilitate better understanding of the method for picture identification provided by the embodiment of the present disclosure by those skilled in the art, the method for picture identification according to the present disclosure will be described in detail by taking a scenario of a pedestrian re-identification as an example.

1) Firstly, a homogeneous network is established.

Figure 8:
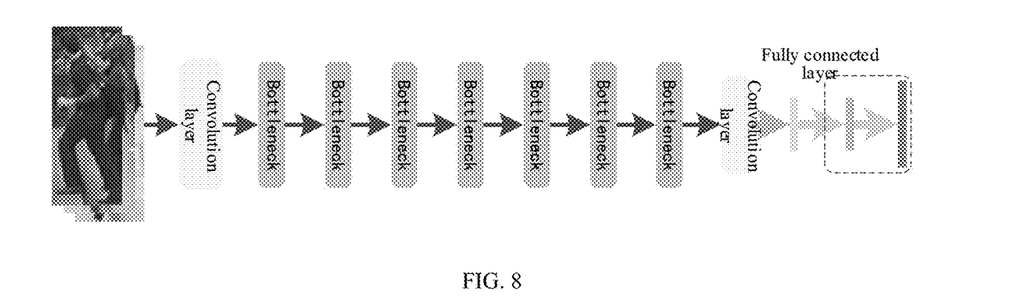
FIG. 8 is a schematic diagram of a main network in a feature extraction model.

FIG. 8 corresponds to a typical MobileNet v2 (one of the three versions in a MobileNet (lightweight network) series, as shown in FIG. 8) network structure. A Bottleneck (bottleneck layer) network structure of MobileNet is a residual structure formed by stacking multiple layers of depthwise separable convolutional networks, which is a fixed structure, and will not be repeatedly described here again. Cony represents a convolution layer Cony 1×1, and an arrow between Cony and fc (the fully connected layer) represents a Global pool layer. A structure in FIG. 8 is completely consistent with that of MobileNet V2.

Figure 7:
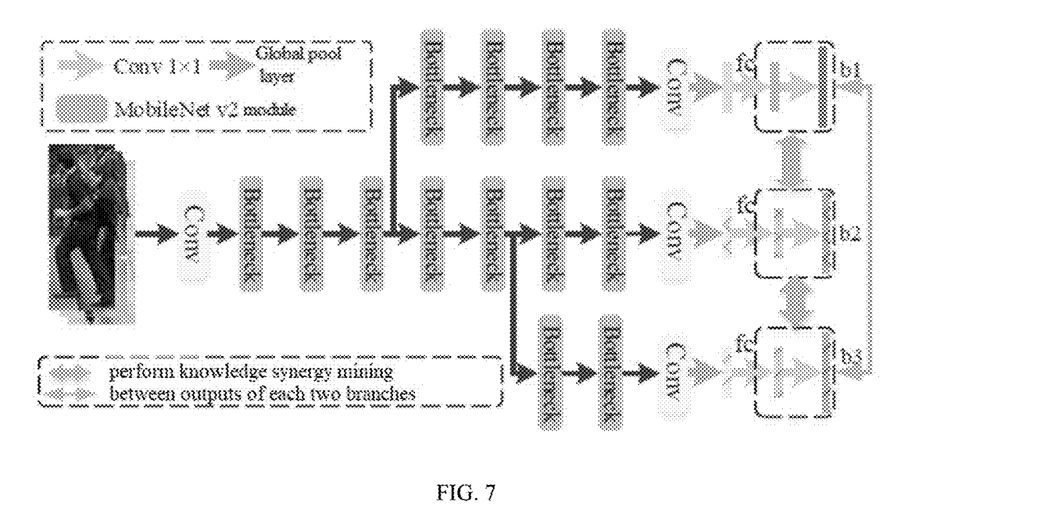
FIG. 7 is a schematic diagram of a homogeneous auxiliary training model from which a homogeneous network is derived according to an embodiment of the present disclosure.

Based on a network structure of MobileNet v2, a homogeneous network branch is derived from a third output position of the Bottleneck, and a homogeneous network branch is derived from a fifth output position of the Bottleneck. As shown in FIG. 7.

The cross entropy loss, triple loss and knowledge collaborative loss are established at an output layer and training is performed. As shown in FIG. 7, bi-directional arrows between b1 and b2, b2 and b3, and b1 and b3 represent knowledge synergy between two branches.

The network is trained to converge and the weights of the trained network are stored.

Homogeneous auxiliary branches are removed and only the main branch is kept. Reference is made to FIG. 8, which shows a corresponding main branch of the network shown in FIG. 7 after removing the homogeneous branches and before deriving from the main branch.

Figure 9:
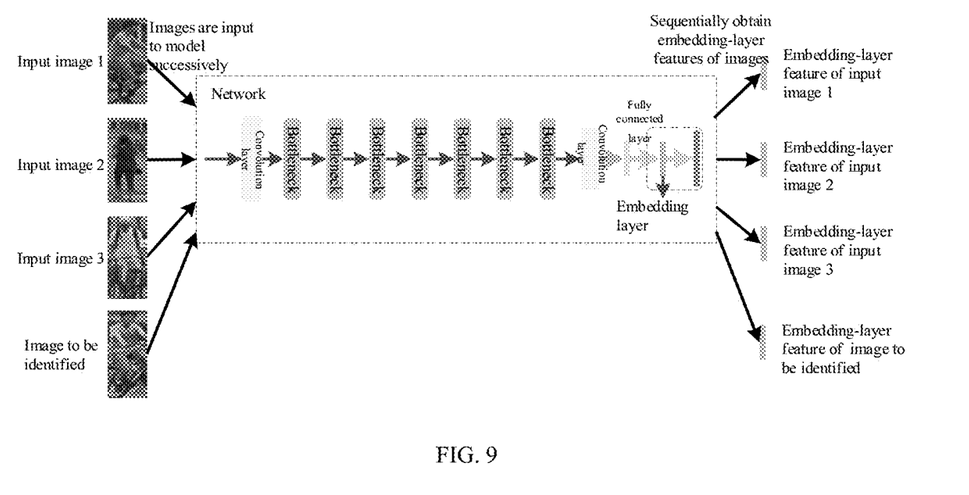
FIG. 9 is an implementation flow chart of a method for picture identification according to an embodiment of the present disclosure.

Referring to FIG. 9, in pedestrian re-identification application, input images 1, 2 and 3 are input to the network to obtain embedding-layer features of the network, and the images 1, 2 and 3 constitute a query data set of a pedestrian re-identification task.

An image to be queried is also input to the network to obtain an embedding-layer feature of the image to be queried.

The embedding-layer feature of the image to be queried is compared with all of features in the query data set, which is made by calculating distances between the embedding-layer feature of the image to be queried and all of the features in the query data set, that is, calculating distances between vectors.

A query data sample with a smallest distance is a same person as that in the image to be queried.

Corresponding to the above method embodiment, an apparatus for picture identification is further provided in the embodiment of the present disclosure, and the apparatus for picture identification described below and the method for picture identification described above may be referred to each other correspondingly.

Figure 10:
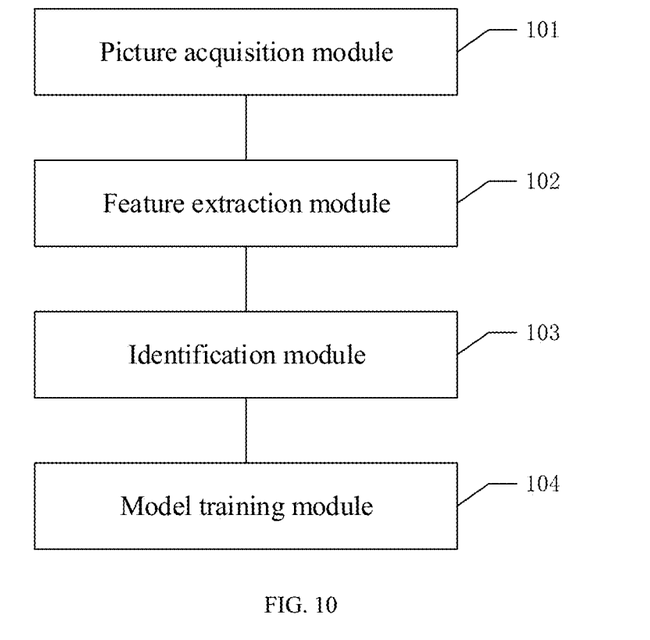
FIG. 10 is a schematic structural diagram of an apparatus for picture identification according to an embodiment of the present disclosure.

Referring to FIG. 10, the apparatus includes following modules: a picture acquisition module 101, a feature extraction module 102, an identification module 103 and a model training module 104.

The picture acquisition module 101 is configured to obtain a target picture to be identified.

The feature extraction module 102 is configured to input the target picture to a trained feature extraction model for feature extraction to obtain an image feature.

The identification module 103 is configured to perform identification on the target picture by using the image feature to obtain an identification result.

The model training module 104 is configured to train the feature extraction model, which includes:
  deriving the homogeneous branches from a main network of a model to obtain the homogeneous auxiliary training model;
  inputting training samples to the homogeneous auxiliary training model in batches to obtain a sample image feature set corresponding to each of the homogeneous branches, training samples in each batch including a plurality of samples, which correspond to a plurality of classes;

calculating a maximum inter-class distance and a minimum inter-class distance respectively corresponding to each of sample image features between every two sample image feature sets;

calculating a knowledge synergy loss value by using the maximum inter-class distance and the minimum inter-class distance;

adjusting parameters of the homogeneous auxiliary training model by using the knowledge synergy loss value until the homogeneous auxiliary training model converges; and removing the homogeneous branches in the converged homogeneous auxiliary training model to obtain the feature extraction model including only a main branch.

The apparatus according to an embodiment of the present disclosure is applied to: obtain a target picture to be identified; input the target picture to a trained feature extraction model for feature extraction to obtain an image feature; and perform picture identification on the target picture by using the image feature to obtain an identification result. A process of training the feature extraction model includes: deriving homogeneous branches from a main network of a model to obtain a homogeneous auxiliary training model; inputting training samples to the homogeneous auxiliary training model in batches to obtain a sample image feature set corresponding to each of the homogeneous branches, training samples in each batch including a plurality of samples, which correspond to a plurality of classes; calculating a maximum inter-class distance and a minimum inter-class distance respectively corresponding to each of sample image features between every two sample image feature sets; calculating a knowledge synergy loss value by using the maximum inter-class distance and the minimum inter-class distance; adjusting parameters of the homogeneous auxiliary training model by using the knowledge synergy loss value until the homogeneous auxiliary training model converges; and removing the homogeneous branches in the converged homogeneous auxiliary training model to obtain the feature extraction model including only a main branch.

In the present embodiment, in training the feature extraction model, homogeneous branches are derived from the main network of the model, to obtain the homogeneous auxiliary training model. Then, after the training samples are input to the homogeneous auxiliary training model in batches, a sample image feature set output by each of the homogeneous branches may be obtained. Then, between every two sample image feature sets, the maximum and minimum inter-class distances corresponding to each of the sample image features are mutually calculated, and the knowledge synergy loss value is calculated; the parameters of the homogeneous auxiliary training model are adjusted based on the knowledge synergy loss value until the homogeneous auxiliary training model converges. That is to say, in training the model, the samples output from the homogeneous branches may be mutually referred to and mined. Finally, after the homogeneous auxiliary training model converges, homogeneous branches derived for auxiliary training are removed, to obtain the feature extraction model with only the main branch. In this way, by deriving the homogeneous branches and performing mutual feature mining, that is, knowledge collaborative auxiliary training, without increasing an amount of parameters and computation amount of the feature extraction model, the feature extraction model has better feature extraction performance and may complete more accurate picture identification based on the image features extracted by the feature extraction model.

In an implementation of the present disclosure, the model training module 104 is configured to derivate the homogeneous branches from the main network of the model; and/or hierarchically derivate the homogeneous branches from the main network of the model.

In an implementation of the present disclosure, the model training module 104 is configured to calculate difference between a respective maximum inter-class distance and minimum inter-class distance, and accumulate the difference to obtain the knowledge synergy loss value.

In an implementation of the present disclosure, the model training module 104 is configured to calculate a triplet loss value of the homogeneous auxiliary training model by using a triplet loss function; to determine a sum of the triple loss value and the knowledge synergy loss value as a total loss value of the homogeneous auxiliary training model; and to adjust the parameters of the homogeneous auxiliary training model by using the total loss value until the homogeneous auxiliary training model converges.

In an implementation of the present disclosure, the model training module 104 is configured to traverse all training samples of each batch to calculate an absolute distance of intra-class difference of each sample in each batch; and to calculate the triplet loss value of the homogeneous auxiliary training model by using the absolute distance.

In an implementation of the present disclosure, the identification module 103 is configured to calculate vector distances between the image feature and respective labeled image features in a query data set; to compare the vector distances to obtain a minimum vector distance; and to determine a label corresponding to the labeled image feature corresponding to the minimum vector distance as the identification result.

In an implementation of the present disclosure, the picture obtaining module 101 is configured to obtain a pedestrian picture to be identified, and determine the pedestrian picture as the target picture. Accordingly, the identification result corresponds to pedestrian identity information.

Corresponding to the above method embodiment, an electronic device is further provided in the embodiment of the present disclosure, and the electronic device described below and the method for picture identification described above may be referred to each other correspondingly.

Figure 11:
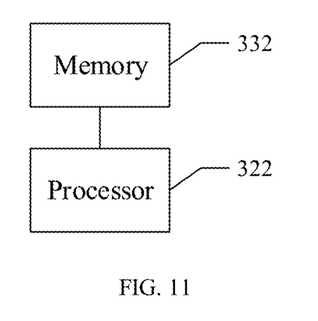
FIG. 11 is a schematic structural diagram of an electronic device according to an embodiment of the present disclosure.

Referring to FIG. 11, the electronic device includes a memory 332 and a processor 322.

The memory 332 is configured to store a computer program.

The processor 322 is configured to implement steps of the method for picture identification of the above method embodiment when executing the computer program.

Figure 12:
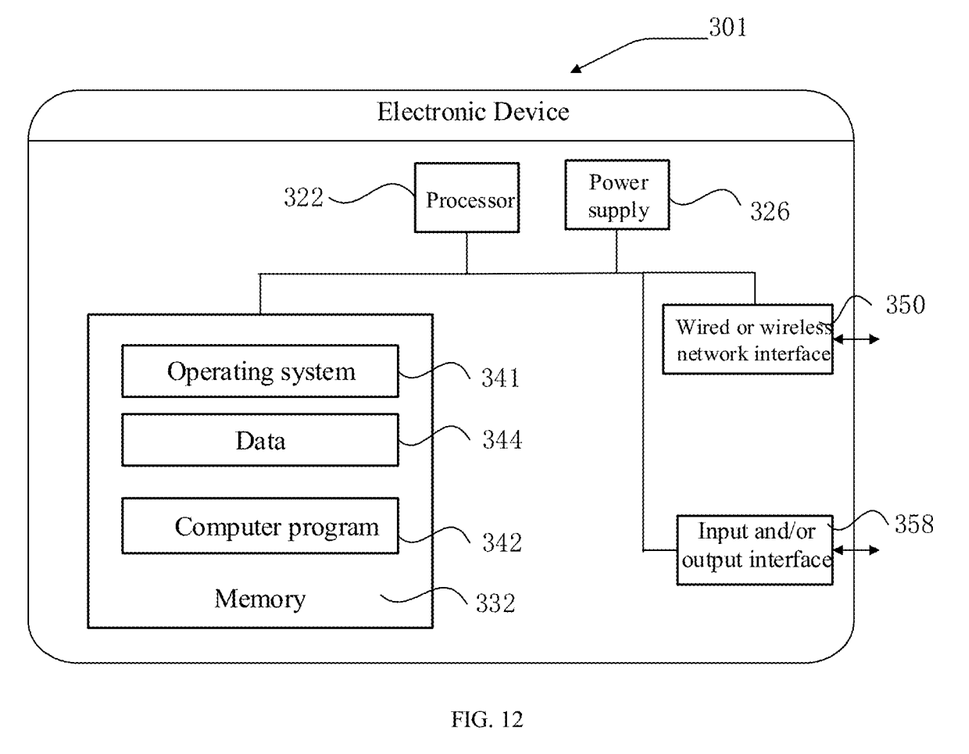
FIG. 12 is a schematic structural diagram of an electronic device according to an embodiment of the present disclosure.

Referring to FIG. 12, which is a schematic structural diagram of an electronic device provided in the present embodiment. The electronic device may largely vary due to different configurations or performances thereof, and may include one or more central processing units (CPU) 322 (for example, one or more processors) and a memory 332, and the memory 332 is configured to store one or more computer applications 342 or data 344. The memory 332 may be transitory storage or persistent storage. The program stored in the memory 332 may include one or more modules (not shown), and each module may include a series of instruction operations on a data processing device. Furthermore, the central processor 322 may be arranged to be communicated with the memory 332 and to execute a series of instruction operations in the memory 332 on the electronic device 301.

The electronic device 301 may also include one or more power supplies 326, one or more wired or wireless network interfaces 350, one or more input and/or output interfaces 358, and/or one or more operating systems 341.

Steps in the method for picture identification described above may be realized with a structure of the electronic device.

Corresponding to the above method embodiment, a non-transitory readable storage medium is further provided in the embodiment of the present disclosure, and the non-transitory readable storage medium described below and the method for picture identification described above may be referred to each other correspondingly.

The readable storage medium has computer program stored thereon, and the computer program, when executed by a processor, implements steps of the method for picture identification in the above method embodiment.

The readable storage medium may be a USB flash drive, a removable hard drive, a Read-Only Memory (ROM), a Random Access Memory (RAM), a magnetic disk, a disk and other readable storage media that may store program codes.

It may be further realized by those skilled in the art that units and algorithm steps of respective examples described in connection with embodiments disclosed herein may be realized in electronic hardware, computer software or a combination of the both. In order to clearly illustrate interchangeability of hardware and software, components and steps of respective examples have been generally described by functions in the above description. Whether these functions are implemented in hardware or software depends on application and design constraints of technical schemes. Described functions may be implemented for each application using different methods by those skilled in the art, but such implementation should not be considered beyond scope of the present disclosure.

The invention claimed is:

1. A method for picture identification, comprising:
obtaining a target picture to be identified;
inputting the target picture into a trained feature extraction model for feature extraction to obtain an image feature; and
performing identification on the target picture by using the image feature to obtain an identification result;
wherein training the feature extraction model comprises:
deriving homogeneous branches from a main network of a model to obtain homogeneous auxiliary training model;
inputting training samples to the homogeneous auxiliary training model in batches to obtain a sample image feature set corresponding to each of the homogeneous branches, training samples in each batch including a plurality of samples, and training samples in each batch correspond to a plurality of classes;
calculating a maximum inter-class distance and a minimum inter-class distance respectively corresponding to each of sample image features between every two sample image feature sets;
calculating a knowledge synergy loss value by using the maximum inter-class distance and the minimum inter-class distance;
adjusting parameters of the homogeneous auxiliary training model by using the knowledge synergy loss value until the homogeneous auxiliary training model converges; and
removing the homogeneous branches in the converged homogeneous auxiliary training model to obtain the feature extraction model including only a main branch.

2. The method for picture identification according to claim 1, wherein deriving the homogeneous branches from the main network of the model to obtain the homogeneous auxiliary training model comprises:
auxiliarily derivating the homogeneous branches from the main network of the model; and/or
hierarchically derivating the homogeneous branches from the main network of the model.

3. The method for picture identification according to claim 1, wherein calculating the knowledge synergy loss value by using the maximum inter-class distance and the minimum inter-class distance comprises:
calculating difference between a maximum inter-class distance and minimum inter-class distance, and accumulating the difference to obtain the knowledge synergy loss value.

4. The method for picture identification according to claim 1, wherein adjusting parameters of the homogeneous auxiliary training model by using the knowledge synergy loss value until the homogeneous auxiliary training model converges comprises:
calculating a triplet loss value of the homogeneous auxiliary training model by using a triplet loss function;
determining a sum of the triple loss value and the knowledge synergy loss value as a total loss value of the homogeneous auxiliary training model; and
adjusting the parameters of the homogeneous auxiliary training model by using the total loss value until the homogeneous auxiliary training model converges.

5. The method for picture identification according to claim 4, wherein calculating the triplet loss value of the homogeneous auxiliary training model by using the triplet loss function comprises:
traversing all training samples of each batch to calculate an absolute distance of intra-class difference of each sample in each batch; and
calculating the triplet loss value of the homogeneous auxiliary training model by using the absolute distance.

6. The method for picture identification according to claim 4, wherein the triplet loss function is expressed as:

$$L_{TriHard}^{b} = -\frac{1}{N}\sum_{a=1}^{N}\left[\max_{y_p=y_a} d(f_e^a, f_e^p) - \min_{y_n \neq y_a} d(f_e^a, f_e^n) + m\right]_{+}$$

wherein $[\bullet]_+$ represents max d ($\bullet$, 0) d ($\bullet$, $\bullet$) represents calculating a distance between vectors; $f_e^a = f(x_a, \theta^b)$, a represents an anchor, that is, an anchor sample; $f_e(\bullet)$ represents obtaining a feature of an image in an Embedding layer of a network; $f^p$ represents an image feature of a same class as the anchor sample; $f^n$ represents an image feature of a different class from the anchor sample.

7. The method for picture identification according to claim 4, wherein the knowledge synergy loss value is calculated by a knowledge synergy for hard sample mutual mining loss function, which is:

$$L_{ksh} = \frac{1}{N}\sum_{\substack{(m,n)\in N \\ m\neq n}}\sum_{\substack{(u,v)\in B \\ u\neq v}}^{B-1}[\max(d_{pos}(f_{em}^u, f_{en}^v)) - \min(d_{neg}(f_{em}^u, f_{en}^v)) + \alpha]_+$$

wherein $f_{em}^u$ represents an embedding-layer feature of an m-th sample in a u-th branch, $f_{en}^v$ represents an embedding-layer feature of an n-th sample in a v-th branch; $d_{pos}(\cdot,\cdot)$ represents calculating a distance between samples of a same class, and $d_{neg}(\cdot,\cdot)$ represents calculating a distance between samples of different classes; a is a hyperparameter and is a constant; $[\cdot]_+$ represents max($\cdot$, 0).

8. The method for picture identification according to claim 1, wherein performing identification on the target picture by using the image feature to obtain an identification result comprises:
   calculating vector distances between the image feature and labeled image features in a query data set;
   comparing the vector distances to obtain a minimum vector distance; and
   determining a label corresponding to the labeled image feature corresponding to the minimum vector distance as the identification result.

9. The method for picture identification according to claim 8, wherein obtaining the target picture to be identified comprises:
   obtaining a pedestrian picture to be identified, and determining the pedestrian picture as the target picture;
   accordingly, the identification result corresponding to pedestrian identity information.

10. An electronic device, comprising:
   a memory for storing a computer program;
   a processor for implementing steps of the method for picture identification according to claim 1 when the computer program is executed.

11. The electronic device according to claim 10, wherein deriving the homogeneous branches from the main network of the model to obtain the homogeneous auxiliary training model comprises:
   auxiliarily derivating the homogeneous branches from the main network of the model; and/or
   hierarchically derivating the homogeneous branches from the main network of the model.

12. The electronic device according to claim 10, wherein calculating the knowledge synergy loss value by using the maximum inter-class distance and the minimum inter-class distance comprises:
   calculating difference between a respective maximum inter-class distance and minimum inter-class distance, and accumulating the difference to obtain the knowledge synergy loss value.

13. The electronic device according to claim 10, wherein adjusting parameters of the homogeneous auxiliary training model by using the knowledge synergy loss value until the homogeneous auxiliary training model converges comprises:
   calculating a triplet loss value of the homogeneous auxiliary training model by using a triplet loss function;
   determining a sum of the triple loss value and the knowledge synergy loss value as a total loss value of the homogeneous auxiliary training model; and
   adjusting the parameters of the homogeneous auxiliary training model by using the total loss value until the homogeneous auxiliary training model converges.

14. The electronic device according to claim 13, wherein calculating the triplet loss value of the homogeneous auxiliary training model by using the triplet loss function comprises:
   traversing all training samples of each batch to calculate an absolute distance of intra-class difference of each sample in each batch; and
   calculating the triplet loss value of the homogeneous auxiliary training model by using the absolute distance.

15. The electronic device according to claim 10, wherein performing identification on the target picture by using the image feature to obtain an identification result comprises:
   calculating vector distances between the image feature and labeled image features in a query data set;
   comparing the vector distances to obtain a minimum vector distance; and
   determining a label corresponding to the labeled image feature corresponding to the minimum vector distance as the identification result.

16. The electronic device according to claim 15, wherein obtaining the target picture to be identified comprises:
   obtaining a pedestrian picture to be identified, and determining the pedestrian picture as the target picture;
   accordingly, the identification result corresponding to pedestrian identity information.

17. A non-transitory readable storage medium, having a computer program stored thereon and the computer program, when executed by a processor, implementing steps of the method for picture identification according to claim 1.

18. The non-transitory readable storage medium according to claim 17, wherein deriving the homogeneous branches from the main network of the model to obtain the homogeneous auxiliary training model comprises:
   auxiliarily derivating the homogeneous branches from the main network of the model; and/or
   hierarchically derivating the homogeneous branches from the main network of the model.

19. The method for picture identification according to claim 1, wherein the target picture comprises a human image, an image of an object, or an image of a monitored scenario.

20. The method for picture identification according to claim 1, wherein the homogeneous auxiliary training model converges refers to a case where a loss value of the homogeneous auxiliary training model tends to be stable, or where the loss value is less than a preset threshold.

* * * * *